(12) United States Patent
Yeryomenko et al.

(10) Patent No.: US 9,256,216 B2
(45) Date of Patent: Feb. 9, 2016

(54) PROCESS VARIABLE COMPENSATION IN A PROCESS TRANSMITTER

(75) Inventors: Sergey V. Yeryomenko, Chelyabinsk (RU); Vladimir V. Repyevsky, Chelyabinsk (RU)

(73) Assignee: Rosemount Inc., Chanhassen, MN (US)

( * ) Notice: Subject to any disclaimer, the term of this patent is extended or adjusted under 35 U.S.C. 154(b) by 345 days.

(21) Appl. No.: 13/816,352

(22) PCT Filed: Apr. 23, 2012

(86) PCT No.: PCT/RU2012/000311
§ 371 (c)(1),
(2), (4) Date: Feb. 11, 2013

(87) PCT Pub. No.: WO2013/162394
PCT Pub. Date: Oct. 31, 2013

(65) Prior Publication Data
US 2013/0282145 A1    Oct. 24, 2013

(51) Int. Cl.
| G06F 19/00 | (2011.01) |
| G05B 19/02 | (2006.01) |
| G01D 3/02  | (2006.01) |
| G01D 3/036 | (2006.01) |

(52) U.S. Cl.
CPC ............... *G05B 19/02* (2013.01); *G01D 3/021* (2013.01); *G01D 3/022* (2013.01); *G01D 3/0365* (2013.01)

(58) Field of Classification Search
CPC ....... G05B 19/02; G01D 3/021; G01D 3/022; G01D 3/0365
See application file for complete search history.

(56) References Cited

U.S. PATENT DOCUMENTS

| 4,748,852 | A | * | 6/1988 | Frick ............................... 73/718 |
| 5,479,096 | A | | 12/1995 | Szczyrbak et al. |
| 5,705,978 | A | * | 1/1998 | Frick et al. .................... 340/511 |
| 5,995,033 | A | | 11/1999 | Roeckner et al. |
| 6,249,753 | B1 | | 6/2001 | Mason et al. |
| 6,304,827 | B1 | * | 10/2001 | Blixhavn et al. .............. 702/104 |
| 6,594,613 | B1 | * | 7/2003 | Ley et al. ...................... 702/140 |

(Continued)

FOREIGN PATENT DOCUMENTS

| CN | 101939708 | 1/2011 |
| CN | 102122146 | 7/2011 |
| DE | 38 03 104 A1 | 8/1989 |

OTHER PUBLICATIONS

Communication pursuant to Rules 161(1) and 162 EPC for European Patent Application No. 12790981.0-1557, dated Dec. 2, 2014, 2 pages.
Office Action from Chinese Patent Application No. 201310063077.9, dated Feb. 13, 2015.
International Search Report and Written Opinion for PCT Application No. PCT/RU2012/000311, dated Mar. 21, 2013, 11 pages.

(Continued)

*Primary Examiner* — Michael D Masinick
(74) *Attorney, Agent, or Firm* — Westman, Champlin & Koehler, P.A.

(57) ABSTRACT

A process variable transmitter includes a process variable sensor having a process variable sensor output related to a sensed process variable. Analog compensation circuitry is configured to receive the process variable sensor output and responsively provide a compensated process variable sensor output based upon a compensation function which is responsive to a control input. Output circuitry provides an output based upon the compensated process variable. Digital control circuitry is coupled to the analog compensation circuitry providing a control output which is applied to the control input of the analog compensation circuitry to thereby control the compensation function.

20 Claims, 5 Drawing Sheets

(56) References Cited

U.S. PATENT DOCUMENTS 7,840,297 B1 * 11/2010 Tuszynski ..................... 700/108
2009/0196374 A1    8/2009 Schulte et al.

OTHER PUBLICATIONS

Office Action from Chinese Patent Application No. 201310063077.9, dated Oct. 30, 2015.

* cited by examiner

US 9,256,216 B2

PROCESS VARIABLE COMPENSATION IN A PROCESS TRANSMITTER

CROSS-REFERENCE TO RELATED APPLICATION

This Application is a Section 371 National Stage Application of International Application No. PCT/RU2012/000311, filed 23 Apr. 2012 not yet published, the contents of which are hereby incorporated by reference in their entirety.

BACKGROUND OF THE INVENTION

The present invention relates to process variable transmitters of the type used in industrial process control and monitoring systems. More specifically, the present invention relates to the compensation of a sensed process variable in a process variable transmitter.

Process variable transmitters are used to monitor industrial processes such as oil refineries, paper pulp manufacturing, etc. The process variable transmitter measures a process variable such as pressure, temperature, flow rate, level, etc. of a process fluid. The measured process variable can be transmitted to another location such as a centralized process control room. The transmission can be over a wired connection such as a two wire process control loop, or it can be over a wireless connection. The sensed process variable may be used to monitor the process, or may be used to control operation of the process.

The process variable is measured using a process variable sensor. Typically, the process variable sensor does not provide a direct linear relationship between its output and the process variable being sensed. The output may be non-linear as a function of the measured process variable, or as a function of other parameters such as temperature of the process variable sensor, etc. It is therefore desirable to compensate the measured process variable in order to improve accuracy of the measurement.

SUMMARY

A process variable transmitter includes a process variable sensor having a process variable sensor output related to a sensed process variable. Analog compensation circuitry is configured to receive the process variable sensor output and responsively provide a compensated process variable sensor output based upon a compensation function which is responsive to a control input. Output circuitry provides an output based upon the compensated process variable. Digital control circuitry is coupled to the analog compensation circuitry providing a control output which is applied to the control input of the analog compensation circuitry to thereby control the compensation function.

DETAILED DESCRIPTION

The present invention provides a method and apparatus for compensating a process variable that is capable of functioning at a relatively high speed and with high accuracy. In one configuration, the invention uses a hybrid technique in which an analog circuitry performs the compensation and the analog circuitry is controlled by digital circuitry.

Figure 1:
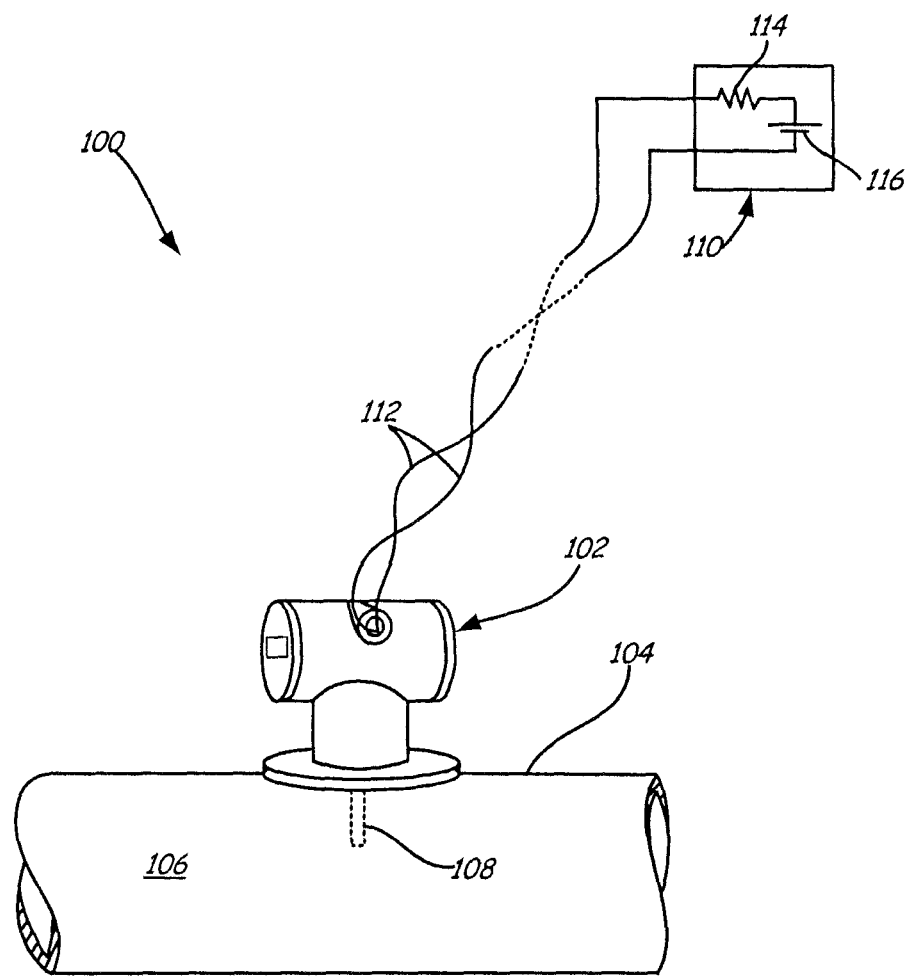
FIG. 1 is a simplified diagram of an industrial process or monitoring system.

FIG. 1 is a simplified block diagram of an industrial process control or monitoring system 100 which includes a process variable transmitter 102 configured to implement the present invention. Process control transmitter 102 is coupled to process piping 104 and is configured to measure a process variable of a process fluid 106 using a process variable sensor 108. Examples of process variables include pressure, temperature, flow rate, level, pH, etc. Circuitry in the process variable transmitter 102 compensates the measured process variable and can be configured to transmit the process variable to a remote location such as a control room 110. The control room 110 in FIG. 1 is illustrated as including a resistance 114 and a power source 116. This transmission can be using wired techniques such as two wire process control loop 112 which is also used to provide power to the process variable transmitter 102. In one example configuration, the two wire process control loop 112 operates in accordance with the HART® communication protocol in which a 4 mA signals represents a low value of the process variable and a 20 mA represents a high value of the process variable. A digital signal can be superimposed on this analog current level. In another example configuration, the process control loop 112 comprises a wireless communication link in which information is transmitted wirelessly to the control 110. Examples include the Wireless HART® communication protocol in accordance with the IEC 62591 Standard.

Figure 2:
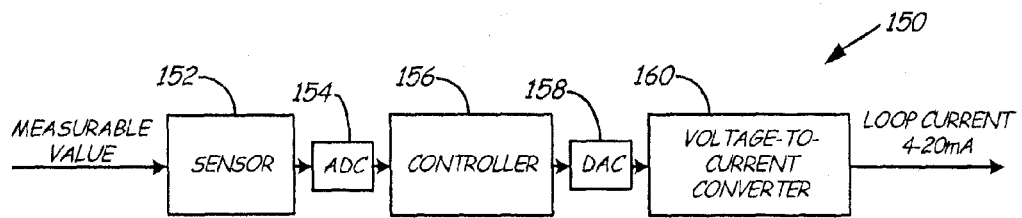
FIG. 2 is a simplified block diagram of a prior art process variable transmitter configuration using digital compensation.

FIG. 2 is a simplified block diagram for the prior art process variable transmitter 150. Transmitter 150 includes a sensor 152 configured to measure a process variable provide an analog output to a digital converter 154. A microprocessor ("controller" or "processor") 156 receives a digital signal from analog to digital converter 154, performs compensation on the digital signal and determines the process variable. Information related to the process variable is provided to a digital to analog converter 158 which converts a digital value to an analog voltage level which is provided to voltage to current converter 160. This is used to control a current on a two wire process control loop between a 4 mA low current level and a 20 mA high current level. The diagram in FIG. 2 is highly simplified and, for example, additional functionality may be provided with additional digital processors and/or analog circuitry. The signal from the sensor 152 can be compensated based upon, for example, temperature or other environmental variables, including non-linearies in the sensor measurement itself. However, such compensation does increase the computational requirements of the processor 156 and also reduces the speed at which measurements may be obtained.

Figure 3:
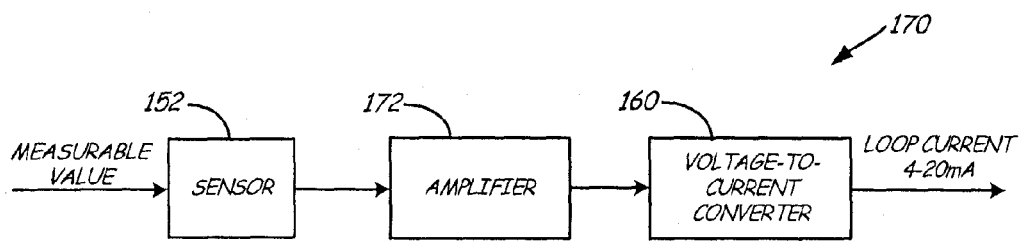
FIG. 3 is a simplified block diagram of a prior art process variable transmitter which does not use compensation.

FIG. 3 is a simplified block diagram of a process variable transmitter 170 which employs a configuration which uses all analog circuitry. In the configuration of FIG. 3, the output from sensor 152 is provided to an amplifier 172. The amplifier 172 provides an analog signal directly to the voltage to current converter 160 for transmission on the two wire process control loop 112. The configuration of transmitter 170 allows for high speed operation, however, it does not provide any compensation (other than amplification) of the output from the sensor 152.

Figure 4:
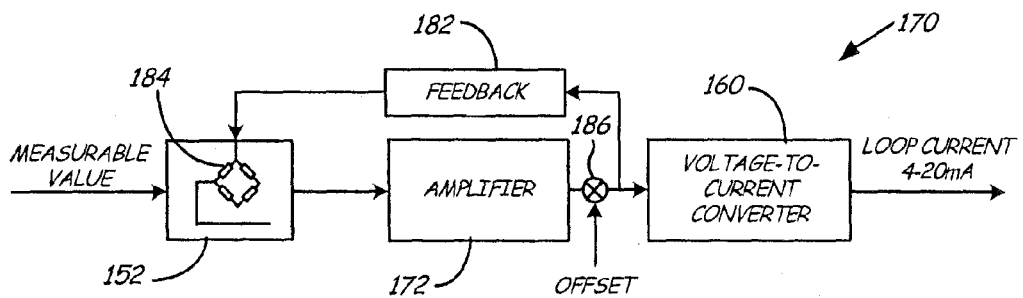
FIG. 4 is a simplified block diagram of a prior art process variable transmitter using analog compensation.

In another example, analog circuitry is used to provide compensation to the sensed process variable. For example, FIG. 4 shows a simplified block diagram of a prior art process variable transmitter 180 which includes feedback circuitry 182 to provide a feedback signal to the measured process variable. In this configuration, the process variable sensor 152 is illustrated as a bridge 184 such as, for example, a strain gauge. The feedback circuitry 182 provides an excitation voltage to the bridge 184 which changes as a function of the output from the amplifier 172 and an offset voltage which is summed with the amplifier output at a summing node 186. The feedback circuitry 182 can be tailored to provide temperature compensation and also linearize the output from the sensor 152. Although the configuration illustrated in FIG. 4 does provide for high speed sensor measurements, it does not provide the accuracy that digital circuitry can provide when compensating the sensed process variable.

Figure 5:
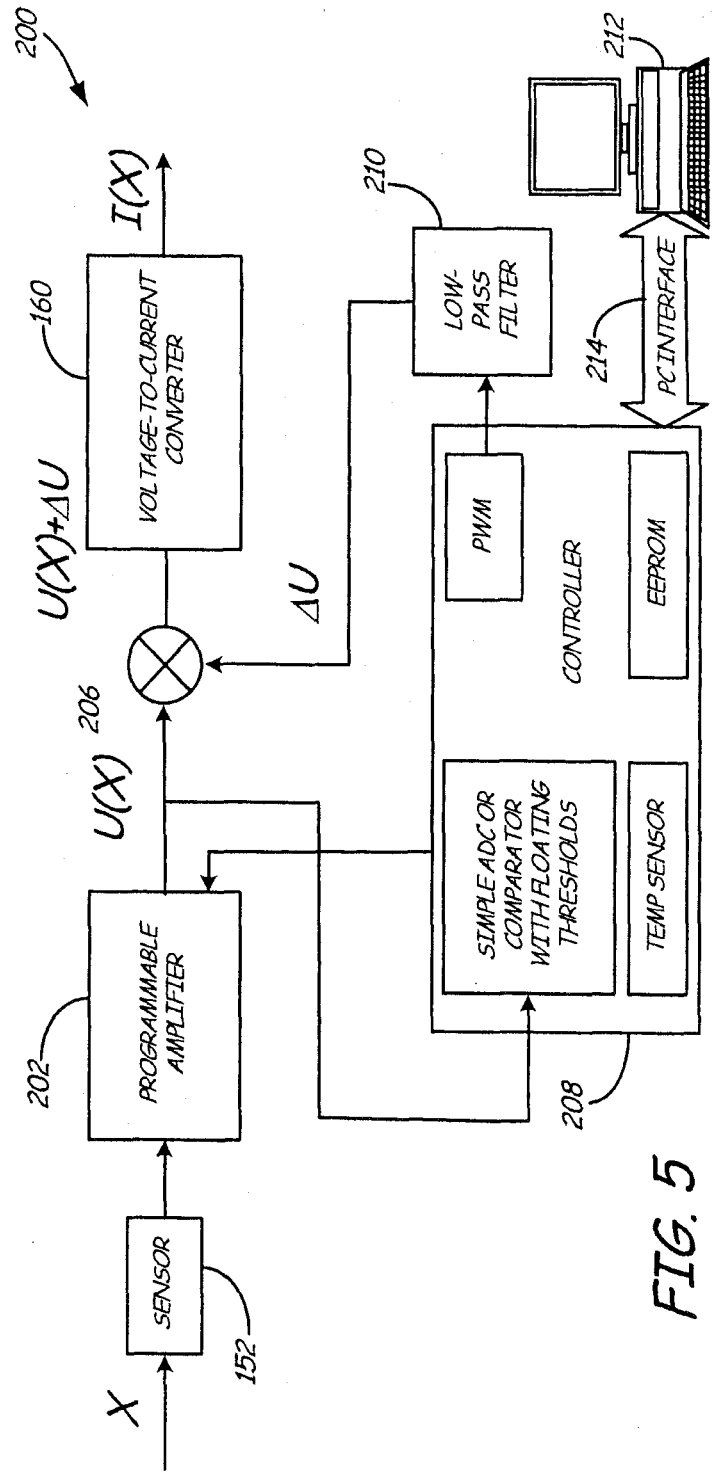
FIG. 5 is a simplified block diagram of a process variable transmitter in accordance with the present invention which employs analog process variable compensation which is controlled by digital circuitry.

The present invention includes a method and apparatus for providing improved sensor accuracy through compensation by using analog compensation techniques which are controlled using a digital controller. FIG. 5 is simplified block diagram of a process variable transmitter including process variable sensor 152 and a voltage to current converter 160. Note that the voltage to current converter 160 may be any type of output circuit and is not limited to any specific embodiment shown. Other examples include any type of process control loop including wired and wireless configurations such as the Wireless HART® communication protocol in accordance with the IEC 62591 Standard. The output from the process variable sensor 152 is amplified using a programmable amplifier 202 and feedback is provided through a summing node 206 prior to being provided to the output circuitry 160. A controller 208 is provided which controls the feedback loop. The programmable amplifier 202 is controlled through an input from controller 208. The summing node 206 receives a feedback signal from the controller 208 through a low pass filter 210. The controller includes an analog to digital converter (or simple comparator circuit) to digitize the output from the programmable amplifier 202. Based upon the digitized value, the amount of amplification provided by amplifier 202 is controlled by the controller 208. A temperature sensor is also illustrated however, other types of environmental sensors may be used to sense environmental or other properties which may affect operation of the sensor 152. A memory is included which contains characterization data.

During operation, the controller identifies a particular range in which the sensor 152 is operating, for example, a pressure range, using the output from the analog to digital converter. Additionally, temperature information is obtained and a feedback (ΔU) signal is introduced to compensate the sensed process variable based upon the particular sensor range and temperature. This compensation is generated using the pulse wave modulator which is filtered using a lowpass filter 210. The amplification provided by the programmable amplifier 202 can be adjusted based upon the particular range of the process variable being measured by the sensor 152. The memory can store information in accordance with any compensation technique including step wise techniques which divide the sensor output and temperature measurements into ranges. Example compensation techniques include linear compensation formulas which are applied over particular ranges as well as polynomial equations. The particular intervals, coefficients, etc., can be determined during a characterization of the device performed during manufacture or subsequently.

FIG. 5 also illustrates a computer (PC) 212 which communicates with controller 208 over a PC interface 214. Computer 212 can be used to monitor operation of the device 200 as well as store compensation information in the EEPROM memory of controller 208. The storage of the compensation information can be performed during manufacturing of the device 200 or may be performed subsequently, for example, to update the compensation based upon the drift in the sensor measurement.

Figure 6:
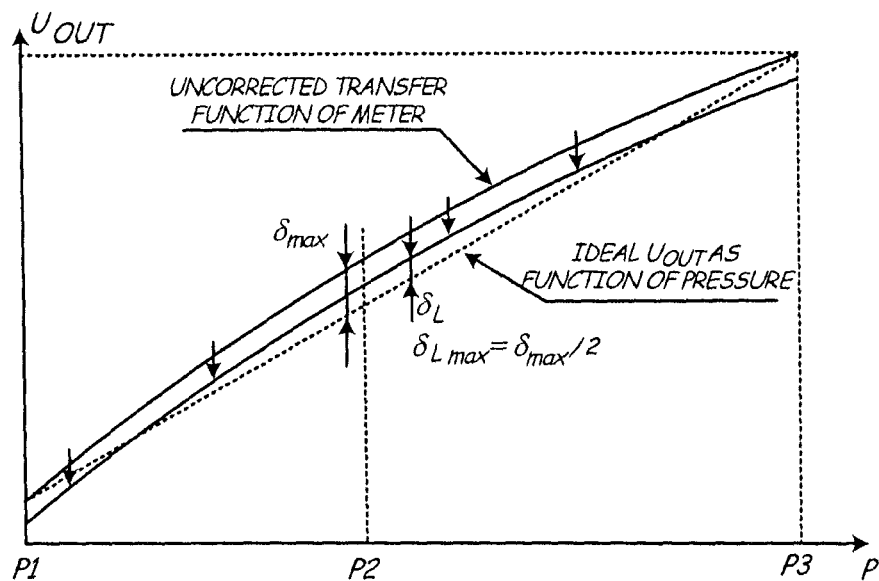
FIG. 6 is a graph which illustrates process variable compensation using two variable ranges.
Figure 7:
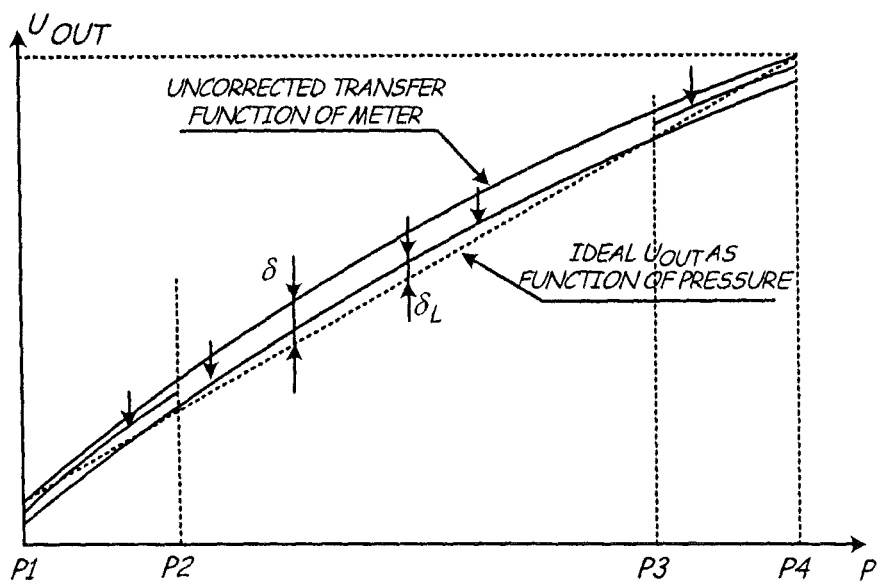
FIG. 7 is a graph which illustrates process variable compensation using three variable ranges.
Figure 8:
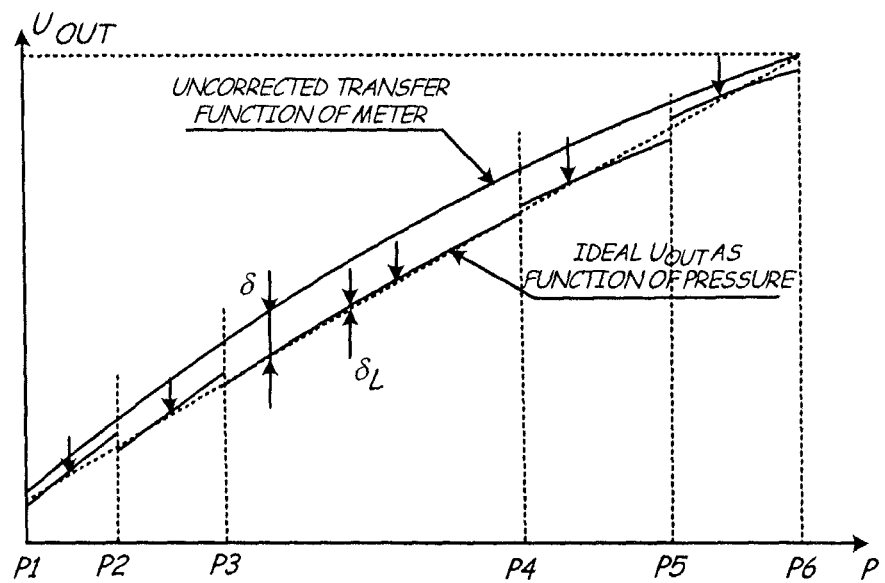
FIG. 8 is a graph which illustrates process variable compensation using five process variable ranges.

FIGS. 6, 7 and 8 are graphs showing the resultant compensated process variable output using differing range intervals. These Figures illustrate a piece-wise-linear characterization of the sensor 152. In FIG. 6, two intervals are used, one between pressures P1 and P2 and one between pressures P2 and P3. In FIG. 7, three pressure ranges are utilized. Note that the pressure ranges are not necessarily uniformly spaced. An additional increase in measurement accuracy is obtained as illustrated in FIG. 8 using five pressure range intervals. The number of pressure ranges can be selected based upon the desired accuracy as well as the linearity of the sensor output. Other types of characterization or compensation techniques may be utilized including polynomials, other curve fitting techniques, etc. Based upon the particular characterization techniques, the amplification provided by amplifier 202 along with the adjustable offset provided at summing node 206 shown in FIG. 5 are provided.

Although the present invention has been described with reference to preferred embodiments, workers skilled in the art will recognize that changes may be made in form and detail without departing from the spirit and scope of the invention. FIG. 5 illustrates the programmable amplifier along with the summing node as an example of analog signal compensation circuitry. However, other analog signal compensation circuitry can be utilized along with other configurations. Further, any type of output circuitry may be utilized including both wired and wireless circuitry. The transmitter may be powered over a wired connection, including a wired connection which is used to carry information, as well as powered using a standalone power system such as a battery, solar cell, etc. Any type of digital circuitry may be utilized and the digital circuitry functionality may be spread across a number of different digital circuits. For example, multiple microprocessors or controllers may be utilized. Similarly, digital functionality can be implemented in logic rays and in some embodiments the enhanced functionality provided by a microprocessor is not required. Any type of digital technique to determine the compensation may be utilized and the present invention is not limited to the particular piecewise linear configuration set forth herein. Other techniques include mapping techniques, other curve fitting techniques including polynomial curve fitting, etc. Although a pressure sensor is described in the detailed description, other types of process variable sensors may be utilized in which compensation is desirable. Further, the compensation may be based upon the output from the sensor, as well as other inputs. These other inputs may come from other sensors, other components, components or inputs including inputs from other transmitters, information related to the particular process fluid, chronological information, age of the components, error measurements, etc.

What is claimed is:

1. A process variable transmitter, comprising;
a process variable sensor having a process variable sensor output related to a sensed process variable over a plurality of ranges;
analog signal compensation circuitry configured to receive the process variable sensor output and responsively provide a compensated process variable sensor output based upon a compensation function which is responsive to a control input;
output circuitry having an output based upon the compensated process variable;
digital control circuitry configured to receive the process variable sensor output coupled to the analog signal compensation circuitry having a control output applied to the control input of the analog signal compensation circuitry to thereby control the compensation function, wherein the control output is a function of a range of the sensed process variable within the plurality of ranges; and
a summing node provided between the analog signal compensation circuitry and the output circuitry and configured to add a feedback to the compensated process variable sensor output.

2. The process variable transmitter of claim 1 wherein the control output is based upon the process variable sensor output.

3. The process variable transmitter of claim 1 wherein the control output is further based upon a sensed environmental measurement.

4. The process variable transmitter of claim 3 wherein the sensed environmental measurement comprises temperature.

5. The process variable transmitter of claim 1 wherein the analog signal compensation circuitry includes a programmable amplifier which amplifies the process variable sensor output as a function of the control output.

6. The process variable transmitter of claim 1 wherein the output circuitry provides a wired output.

7. The process variable transmitter of claim 1 wherein the output circuitry provides a wireless output.

8. The process variable transmitter of claim 1 wherein the control output is based upon a piecewise linear compensation algorithm.

9. The process variable transmitter of claim 1 wherein the control output is based upon a polynomial.

10. The process variable transmitter of claim 1 including an environment sensor having an environment sensor output indicative of an environment of the process variable transmitter and wherein the compensation output is further a function of environment sensor output.

11. The process variable transmitter of claim 1 wherein the digital control circuitry determines a sensor range of operation within the plurality of sensor ranges and the control output is a function of the determined sensor range of operation within the plurality of sensor ranges.

12. A method performed in a process variable transmitter, comprising:
sensing a process variable of an industrial process fluid using a process variable sensor and providing a process variable sensor output representative of the sensed process variable over a plurality of ranges;
compensating the process variable output using analog circuitry and thereby reducing errors in a measured process variable, the analog signal compensation circuitry compensating the process variable as a function of a control input;
providing a transmitter output based upon the compensated process variable;
determining a control output based upon the process variable sensor output which is applied to the control input of the analog signal compensation circuitry using digital control circuitry and thereby responsively controlling a compensation function of the analog signal compensation circuitry, wherein the control output is a function of a range of the sensed process variable within the plurality of ranges; and
summing the compensated process variable sensor output with a feedback at a summing node between the analog signal compensation circuitry and output circuitry.

13. The method of claim 12 wherein the control output is based upon the process variable sensor output.

14. The method of claim 12 wherein the control output is based upon a sensed environmental measurement.

15. The method of claim 14 wherein the sensed environmental measurement comprises temperature.

16. The method of claim 12 wherein the step of compensating includes adjusting amplification of a programmable amplifier which amplifies the process variable sensor output as a function of the control output.

17. The method of claim 12 wherein the output circuitry provides a wired output.

18. The method of claim 12 wherein the output circuitry provides a wireless output.

19. The method of claim 12 wherein the control output is based upon a piecewise linear compensation algorithm.

20. The method of claim 12 wherein the control output is based upon a polynomial.

* * * * *